United States Patent
Abramson et al.

(10) Patent No.: US 7,440,421 B2
(45) Date of Patent: Oct. 21, 2008

(54) DETECTION OF LOOPING COMMUNICATION CHANNELS

(75) Inventors: Sandra R. Abramson, Freehold, NJ (US); Frank John Boyle, III, Broomfield, CO (US); David Lee Chavez, Jr., Thornton, CO (US); C. Joanne McMillen, Northglenn, CO (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 560 days.

(21) Appl. No.: 10/953,643

(22) Filed: Sep. 29, 2004

(65) Prior Publication Data

US 2006/0067359 A1  Mar. 30, 2006

(51) Int. Cl.
*H04Q 11/00* (2006.01)
(52) U.S. Cl. .............. 370/259; 370/331; 379/22.01
(58) Field of Classification Search .......... 370/331, 370/332, 333, 334, 310, 464, 229, 259, 260, 370/217, 222, 249; 455/436; 379/22.01, 379/93.34, 93.35, 157, 158, 211.02
See application file for complete search history.

(56) References Cited

U.S. PATENT DOCUMENTS

| | | | |
|---|---|---|---|
| 4,488,004 A | 12/1984 | Bogart et al. | |
| 5,371,732 A * | 12/1994 | Brocken et al. | 370/217 |
| 6,167,256 A * | 12/2000 | Yla-Outinen et al. | 455/417 |
| 6,501,952 B1 * | 12/2002 | Foster et al. | 455/436 |
| 6,594,492 B2 * | 7/2003 | Choi et al. | 455/436 |
| 6,614,769 B1 * | 9/2003 | Erlick et al. | 370/331 |
| 6,640,108 B2 | 10/2003 | Lu et al. | |
| 6,728,345 B2 | 4/2004 | Glowny et al. | |
| 6,731,740 B1 | 5/2004 | Choudhury et al. | |
| 6,751,204 B1 * | 6/2004 | Foti et al. | 370/328 |
| 6,845,152 B2 * | 1/2005 | Taff et al. | 379/211.02 |
| 7,133,516 B2 * | 11/2006 | Belkin et al. | 379/211.02 |
| 7,242,941 B2 * | 7/2007 | Adatrao et al. | 455/442 |
| 2003/0161460 A1 | 8/2003 | Dammrose | |

FOREIGN PATENT DOCUMENTS

| | | |
|---|---|---|
| JP | 54116809 | 9/1979 |
| JP | 2081555 | 3/1990 |
| JP | 9200370 | 7/1997 |
| WO | WO 96/20554 | 7/1996 |

\* cited by examiner

*Primary Examiner*—Ricky Ngo
*Assistant Examiner*—Gary Mui
(74) *Attorney, Agent, or Firm*—DeMont & Breyer LLC

(57) ABSTRACT

A method is disclosed that enables a data-processing system, such as a private branch exchange, to detect and disconnect looping communication channels, without some of the costs, disadvantages, and limitations of techniques in the prior art. The illustrative embodiment of the present invention provides detection of looping communication channels at the point where the loop begins. By detecting at the beginning point of the loop, the illustrative embodiment has the advantage of de-allocating call resources sooner than some techniques in the prior art. This enables the call resources to be reused faster for subsequent incoming and outgoing calls. Faster reuse is advantageous because it can lower the call blocking characteristic, which is related to the probability of a new call not being set up due to lack of communication channel resources.

14 Claims, 5 Drawing Sheets

DETECTION OF LOOPING COMMUNICATION CHANNELS

FIELD OF THE INVENTION

The present invention relates to telecommunications in general, and, more particularly, to a technique for detecting and managing communication channels.

BACKGROUND OF THE INVENTION

FIG. 1 depicts telecommunications system 100 in the prior art. Telecommunications system 100 comprises originating data-processing system 101; tandemed data-processing system 102; forward data-processing system 103; communication channels 104, 105-1 through 105-J, and 106-1 through 106-K; and telecommunications terminals 109 and 110, interconnected as shown. J and K are positive integers. User 108 interfaces with telecommunications system 100 by using telecommunications terminals 109 and 110.

Originating data-processing system 101, also known as a "central office switch," serves one or more associated telecommunications terminals by supporting calls between those terminals and terminals that are served by other telecommunications switching devices. Originating data-processing system 101 is capable of setting up a call to a telecommunications terminal served by tandemed data-processing system 102, also known as a "private branch exchange" (or "PBX"). Furthermore, originating data-processing system 101 transmits speech and other signals to tandemed data-processing system 102 via communication channel 104.

Tandemed data-processing system 102, also known as a "private branch exchange," serves one or more associated telecommunications terminals in a corporate environment by supporting calls between those terminals and terminals that are served by other telecommunications switching devices. Tandemed data-processing system 102 is capable of setting up a call from originating data-processing system 101, and receives speech and other signals for that call from originating data-processing system 101 via communication channel 104, which is also known as a "trunk." Furthermore, tandemed data-processing system 102 is capable of setting up a call from forward data-processing system 103, and receives speech and other signals for that call from forward data-processing system 103 via communication channel 106, which is another trunk.

Tandemed data-processing system 102 is further capable of "tandeming" a call by extending the incoming call on communication channel 104 to outgoing communication channel 105, which is yet another trunk. When a telecommunications switching device is "tandemed," it does not serve an end user directly, but does interconnect other switching devices in supporting a call. An example of a tandeming application is when a telecommunications terminal user, such as user 108 of deskset terminal 109, has incoming calls forwarded to another terminal, such as cellular terminal 110. The example reflects the commonplace practice of a user in a corporate environment who forwards calls to a cell phone when away from his or her office deskset terminal, in order to still be reachable by callers. In the example, tandemed data-processing system 102 selects communication channel 105 to forward the call.

Forward data-processing system 103, also known as a "wireless switching center," serves one or more associated cellular telecommunications terminals by supporting calls between those terminals and terminals that are served by other data-processing systems. Forward data-processing system 103 is capable of setting up a call to one of its associated telecommunications terminals from a telecommunications terminal that is served—directly or indirectly—by tandemed data-processing system 102. Furthermore, forward data-processing system 103 receives speech and other signals from tandemed data-processing system 102 via communication channel 105.

Forward data-processing system 103 is further capable of forwarding a call by extending the incoming call on communication channel 105 to outgoing communication channel 106. An example of a forwarding application is when a telecommunications terminal user, such as user 108 of cellular terminal 110, has incoming calls forwarded to another terminal, such as deskset terminal 109, whenever the user does not answer a call. The example reflects the commonplace practice of users in a corporate environment forwarding calls to their corporate voice mail boxes in order to concentrate received voice messages into one voice mail system. In the example, forward data-processing system 103 selects communication channel 106 to forward the call.

A problem arises when user 108 has calls forwarded from terminal 109 to terminal 110 and from terminal 110 to terminal 109 at the same time. This concurrent forwarding of calls causes a "loop situation" to occur, in which an incoming call to tandemed data-processing system 102 gets forwarded to forward-data-processing data-processing system 103, then gets forwarded back to data-processing system 102, then gets forwarded back to data-processing system 103, and so on. In a loop situation, tandemed data-processing system 102 and forward data-processing system 103 will continue to allocate communication channels 105-2 through 105-j and 106-2 through 106-K. This can result in all available communication channel resources at tandemed data-processing system 102 being consumed.

Techniques exist in the prior art for detecting looping trunks. Such techniques, however, are typically slow to de-allocate all of the consumed resources. What is needed is a technique to detect and disconnect looping communication channels, without some of the costs, disadvantages, and limitations of techniques in the prior art.

SUMMARY OF THE INVENTION

The present invention enables a data-processing system, such as a private branch exchange, to detect and disconnect looping communication channels, without some of the costs, disadvantages, and limitations of techniques in the prior art. The illustrative embodiment of the present invention provides detection of looping communication channels at the point where the loop begins. By detecting at the beginning point of the loop, the illustrative embodiment has the advantage of de-allocating call resources sooner than some techniques in the prior art. This enables the call resources to be reused faster for subsequent incoming and outgoing calls. Faster reuse is advantageous because it can lower the call blocking characteristic, which is related to the probability of a new call not being set up due to lack of communication channel resources.

In the illustrative embodiment of the present invention, when the detecting data-processing system extends a call (e.g., out to a forward data-processing system, etc.), it transmits three elements: the calling number, a call identifier, and a redirecting number. The calling number comes from an originating data-processing system, the call identifier is generated by the detecting data-processing system, and the redirecting number is the called number that is redirected to a number associated with the forward data-processing system. Whenever the detecting data-processing system receives an incoming call where the called number matches a known redirecting number (e.g., an extension at a private branch exchange, etc.), the detecting data-processing system checks for outgoing calls that are in call states in which the call delivery is at least proceeding. If it finds a call in one of those call states, the detecting data-processing system checks the incoming call for at least a portion of the information previously forwarded. If any of the received calling number, call identifier, and redirecting number match what was transmitted previously, the detecting data-processing system concludes that is has detected a loop, and generates one or more signals to disconnect the communication channel(s) in the loop.

The illustrative embodiment of the present invention comprises: a method comprising generating a first signal at a first data-processing system to disconnect a first communication channel associated with a call; wherein the call is tandemed out of the first data-processing system to a second data-processing system; and wherein generating the first signal occurs after information related to the call is transmitted by the first data-processing system to the second data-processing system; and wherein generating the first signal is based on at least a portion of the information at the first data-processing system from the second data-processing system.

DETAILED DESCRIPTION

The terms appearing below are given the following definitions for use in this Description and the appended claims.

For the purposes of the specification and claims, the term "communication channel" is defined as a path between two data-processing systems (e.g., telecommunications switches, private branch exchanges, etc.) that enables the transmission of speech and other signals. A "trunk," as is known in the art, is an example of a communication channel.

For the purposes of the specification and claims, the term "call" is defined as an arrangement that provides for, or attempts to provide for, a relation between two or more simultaneously present users for the purpose of exchanging information. An example of a call used in the illustrative embodiment is a telephony call, in which two users of a telecommunications system exchange speech and other signals. As will be appreciated by those skilled in the art, the present invention is applicable to other types of calls and "sessions," as are known in the art. For example, a session establishment request for the exchange of information (e.g., video streaming, instant messaging, etc.) might use up resources between data-processing systems. As a result, the session establishment request might require a detection of looping channels (i.e., physical or virtual) and a de-allocation of resources, similar to what is provided by the illustrative embodiment of the present invention.

Figure 1:
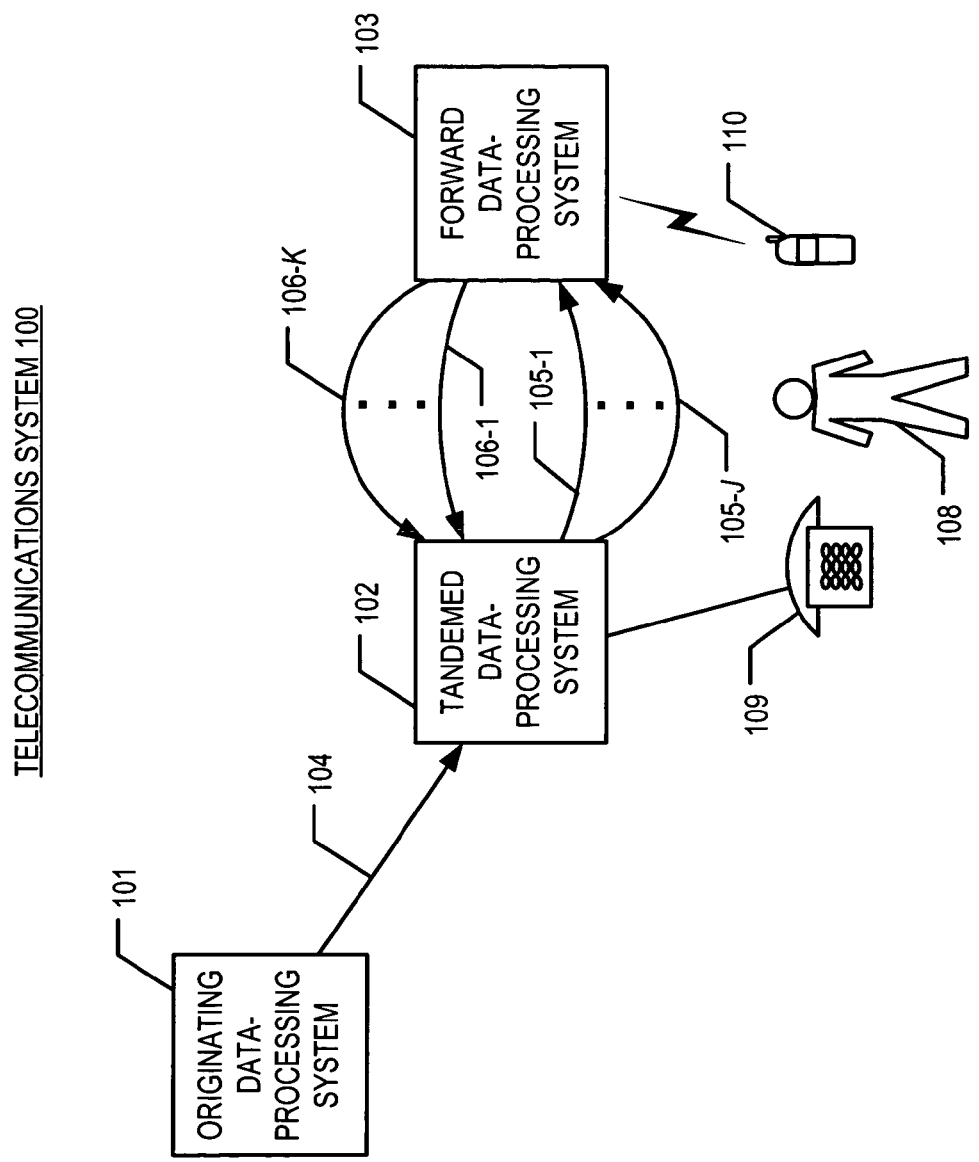
FIG. 1 depicts telecommunications system 100 in the prior art.
Figure 2:
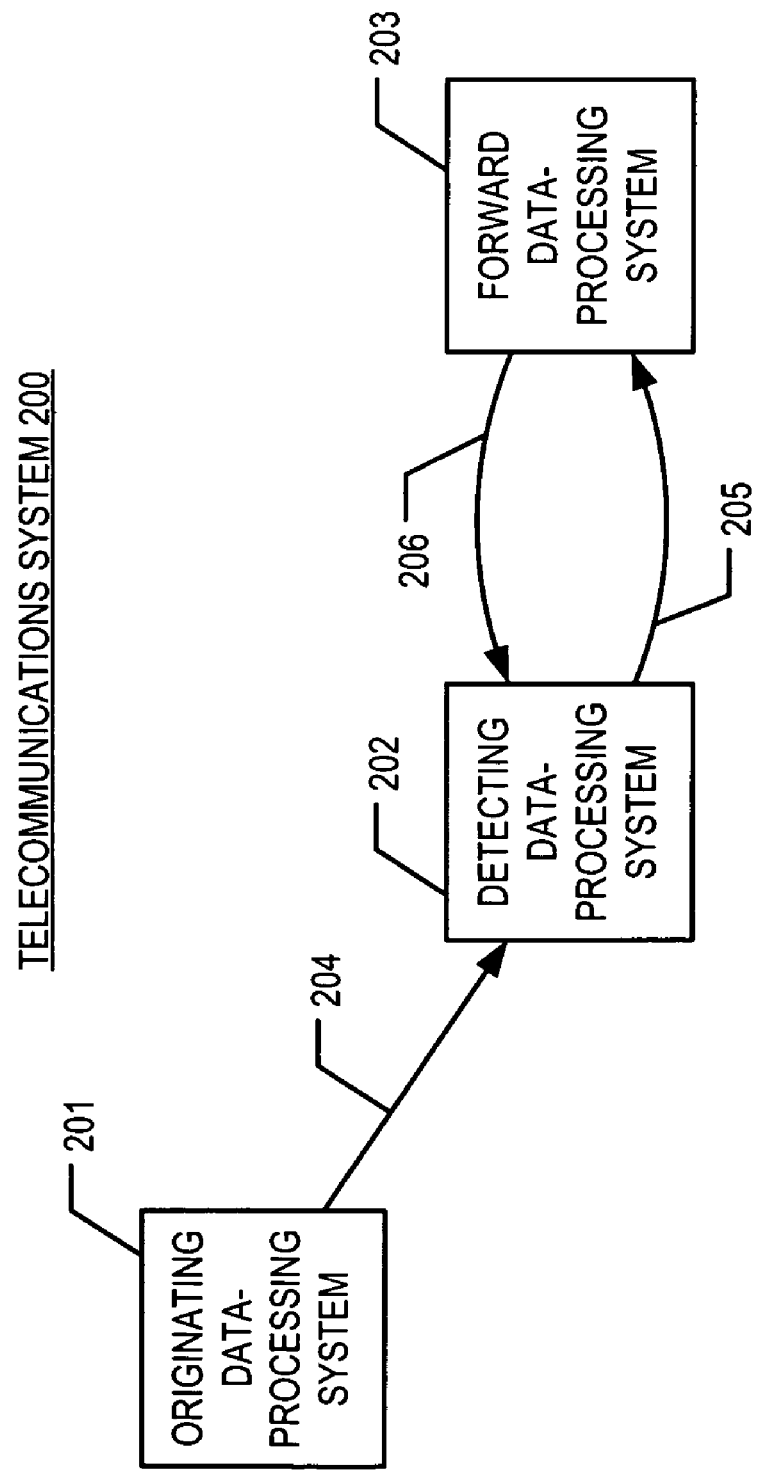
FIG. 2 depicts telecommunications system 200 in accordance with the illustrative embodiment of the present invention.

FIG. 2 depicts telecommunications system 200 in accordance with the illustrative embodiment of the present invention. Telecommunications system 200 comprises originating data-processing system 201; detecting data-processing system 202; forward data-processing system 203; and communication channels 204, 205, and 206, interconnected as shown.

Originating data-processing system 201 is equivalent to originating data-processing system 101. Originating data-processing system 201 serves one or more associated telecommunications terminals, as are known in the art, by supporting calls between those terminals and terminals that are served by other data-processing systems. Originating data-processing system 201 is capable of setting up a call to a telecommunications terminal served by detecting data-processing system 202. Furthermore, originating data-processing system 201 transmits speech and other signals to detecting data-processing system 202 in well-known fashion via communication channel 204. It will be clear to those skilled in the art how to make and use originating data-processing system 201.

In accordance with the illustrative embodiment, originating data-processing system 201 is a telecommunications switch. It will be clear, however, to those skilled in the art that in some embodiments originating data-processing system 201 might be a router, a private branch exchange, etc.

Detecting data-processing system 202 serves one or more associated telecommunications terminals by supporting calls between those terminals and terminals that are served by other data-processing systems. Detecting data-processing system 202 is capable of setting up a call from originating data-processing system 201, and receives speech and other signals for that call from originating data-processing system 201 via communication channel 204. Furthermore, detecting data-processing system 202 is capable of setting up a call from forward data-processing system 203, and receives speech and other signals for that call from forward data-processing system 203 via communication channel 206.

Detecting data-processing system 202 is further capable of tandeming a call (and in so doing, becoming "tandemed") by extending the incoming call on communication channel 204 to outgoing communication channel 205 in well-known fashion.

In accordance with the illustrative embodiment, detecting data-processing system 202 is a Private Branch Exchange (or "PBX"). In some alternative embodiments, detecting data-processing system 202 might be another type of switching or routing device. It will be clear to those skilled in the art, after reading this specification, how to make and use detecting data-processing system 202.

Forward data-processing system 203 is equivalent to forward data-processing system 103. Forward data-processing system 203 serves one or more associated telecommunications terminals by supporting calls between those terminals and terminals that are served by other data-processing systems. Forward data-processing system 203 is capable of setting up a call to one of its associated telecommunications terminals from a telecommunications terminal served by detecting data-processing system 202. Furthermore, forward data-processing system 203 receives speech and other signals for a call from detecting data-processing system 202 via communication channel 205.

Forward data-processing system 203 is further capable of forwarding a call by extending the incoming call on communication channel 205 to outgoing communication channel 206 in well-known fashion. It will be clear to those skilled in the art how to make and use forward data-processing system 203.

In accordance with the illustrative embodiment, forward data-processing system 203 is a telecommunications switch. It will be clear, however, to those skilled in the art that forward data-processing system 203 might instead be a router, a private branch exchange, etc.

Communication channels 204, 205, and 206 interconnect the depicted data-processing systems, as described above. Communication channels 204, 205, and 206 carry speech and user-application signals between data-processing systems. In accordance with the illustrative embodiment, communication channels 204, 205, and 206 also carry control signals and information that data-processing systems 201, 202, and 203 use to manage calls. As will be appreciated by those skilled in the art, in some alternative embodiments control signals and information might be carried by channels other than communication channels 204, 205, and 206, such as channels in an overlaid signaling system network.

As will be further appreciated by those skilled in the art, in some embodiments two or more telecommunications terminals in telecommunications system 200 might be connected during a call via data-processing systems in addition to systems 201, 202, and 203. It will be clear to those skilled in the art how to make and use telecommunications system 200 with additional data-processing systems present than depicted in FIG. 2.

Figure 3:
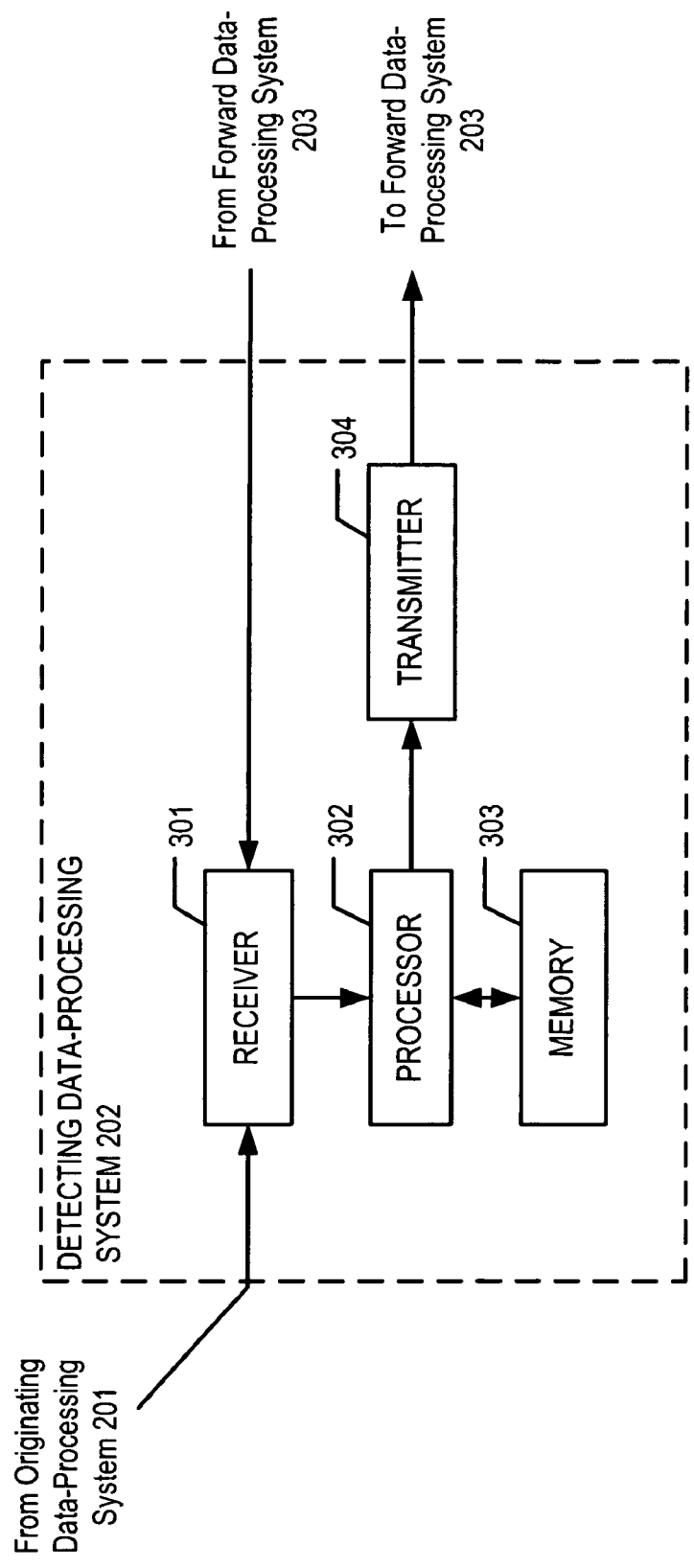
FIG. 3 depicts a block diagram of data-processing system 202, as shown in FIG. 2, in accordance with the illustrative embodiment of the present invention.

FIG. 3 depicts a block diagram of the salient components of (detecting) data-processing system 202, in accordance with the illustrative embodiment of the present invention. Data-processing system 202 comprises receiver 301, processor 302, memory 303, and transmitter 304, interconnected as shown.

Receiver 301 receives from originating data-processing system 201 and from forward data-processing system 203 signals that convey speech and control information, and forwards the information encoded in the signals to processor 302, in well-known fashion. It will be clear to those skilled in the art, after reading this specification, how to make and use receiver 301.

Processor 302 is a general-purpose processor that is capable of receiving information from receiver 301, of executing instructions stored in memory 303, of reading data from and writing data into memory 303, of executing the tasks described below and with respect to FIGS. 4 and 5, and of transmitting information to transmitter 304. In some alternative embodiments of the present invention, processor 302 might be a special-purpose processor. In either case, it will be clear to those skilled in the art, after reading this specification, how to make and use processor 302.

Memory 303 stores data and executable instructions, as is well-known in the art, and might be any combination of random-access memory (RAM), flash memory, disk drive memory, etc. It will be clear to those skilled in the art, after reading this specification, how to make and use memory 303.

Transmitter 304 receives information from processor 302 and transmits signals that encode this information to forward data-processing system 203, in well-known fashion. It will be clear to those skilled in the art, after reading this specification, how to make and use transmitter 304.

Figure 4:
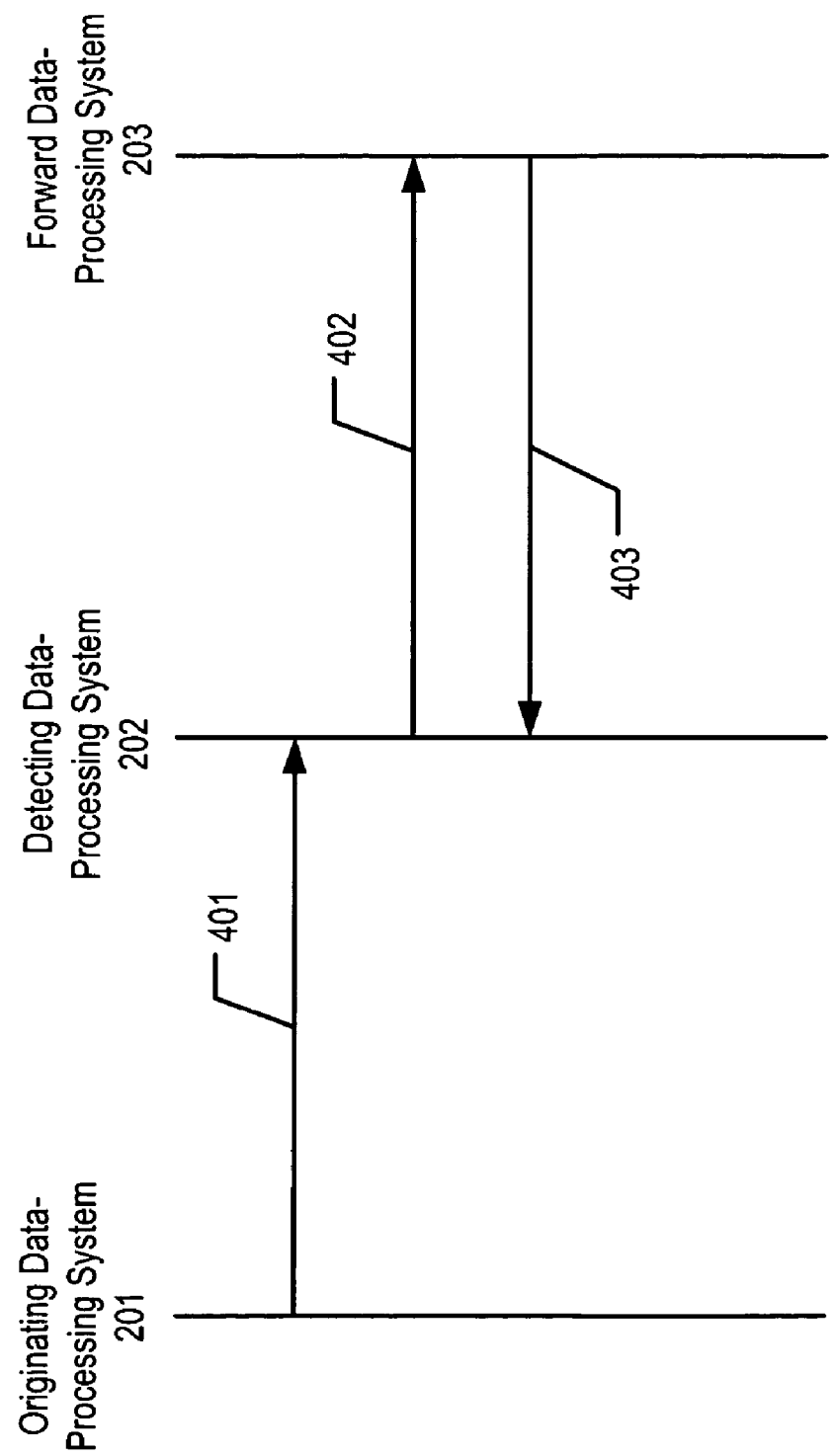
FIG. 4 depicts a message flow diagram of telecommunications system 200, in accordance with the illustrative embodiment of the present invention.

FIG. 4 depicts a message flow diagram of telecommunications system 200, in accordance with the illustrative embodiment of the present invention. The message flow of FIG. 4 represents an illustrative call setup scenario. In accordance with the illustrative embodiment, the messages depicted in FIG. 4 are transmitted via an Integrated Services Digital Network (ISDN), as is known in the art. As will be appreciated by those skilled in the art, in some alternative embodiments the messages might be transmitted via another type of network.

In accordance with the illustrative embodiment of the present invention, some identifying elements use a number—as in "called number," "calling number," "redirecting number," etc.—to identify the users or terminals of a call. As will be appreciated by those skilled in the art, those numeric identifiers in a telephony call have analogous, non-numeric identifiers in other types of calls, such as in a call that is enabled by session initiation protocol (or "SIP"), as is known in the art. For example, a SIP-enabled call might use a SIP uniform resource identifier (or "URI"), also known in the art, to identify a user. It will be clear to those skilled in the art, after reading this specification, how to make and use telecommunications system 200 with non-numeric identifiers of the users or terminals.

In setting up a call from an associated telecommunications terminal, originating data-processing system 201 transmits message 401 to detecting data-processing system 202 in well-known fashion. Message 401 comprises information about the call, including the called number and the calling number, as are known in the art.

Detecting data-processing system 202 receives message 401 and checks the called number. In the example, the user associated with the called number has previously specified that at least the current incoming call is to be forwarded to the user's cellular terminal, which is currently served by forward data-processing system 203 and is associated with a first forward-to number. As a result, detecting data-processing system 202 transmits message 402 to forward data-processing system 203 in well-known fashion. Detecting data-processing system 202 considers this extension of the call to forward data-processing system 203 to be an "outgoing call." Message 402 comprises information about the outgoing call, including (i) the first forward-to number, (ii) the original calling number, (iii) a redirecting number, and (iv) coded information about the call, in accordance with the illustrative embodiment of the present invention. The redirecting number and the coded information are described below and with respect to FIG. 5.

Forward data-processing system 203 receives message 402 and checks the first forward-to number (i.e., a called number). In the example, the user associated with the first forward-to number has previously specified that a call is to be forwarded to the user's corporate voice mailbox, supported by detecting data-processing system 202 and associated with a second forward-to number, in the event that the user does not answer his or her cellular terminal. The user does not answer, and as a result, forward data-processing system 203 transmits message 403 to detecting data-processing system 202 in well-known fashion. Message 403 comprises information about the forwarded call, including the second forward-to number. Forward data-processing system 203 can also transmit in message 403 one or more of the (i) original calling number, (ii) redirecting number, and (iii) coded information received in message 402, in well-known fashion.

Detecting data-processing system 202 receives message 403 and checks the second forward-to number (i.e., a called number). Note that in the example provided, the forward-to number received in message 403 from forward data-processing system 203 is the same as the called number originally received in message 401 from originating data-processing system 201.

The subsequent treatment of message 403 and the associated call is described below and with respect to FIG. 5.

Figure 5:
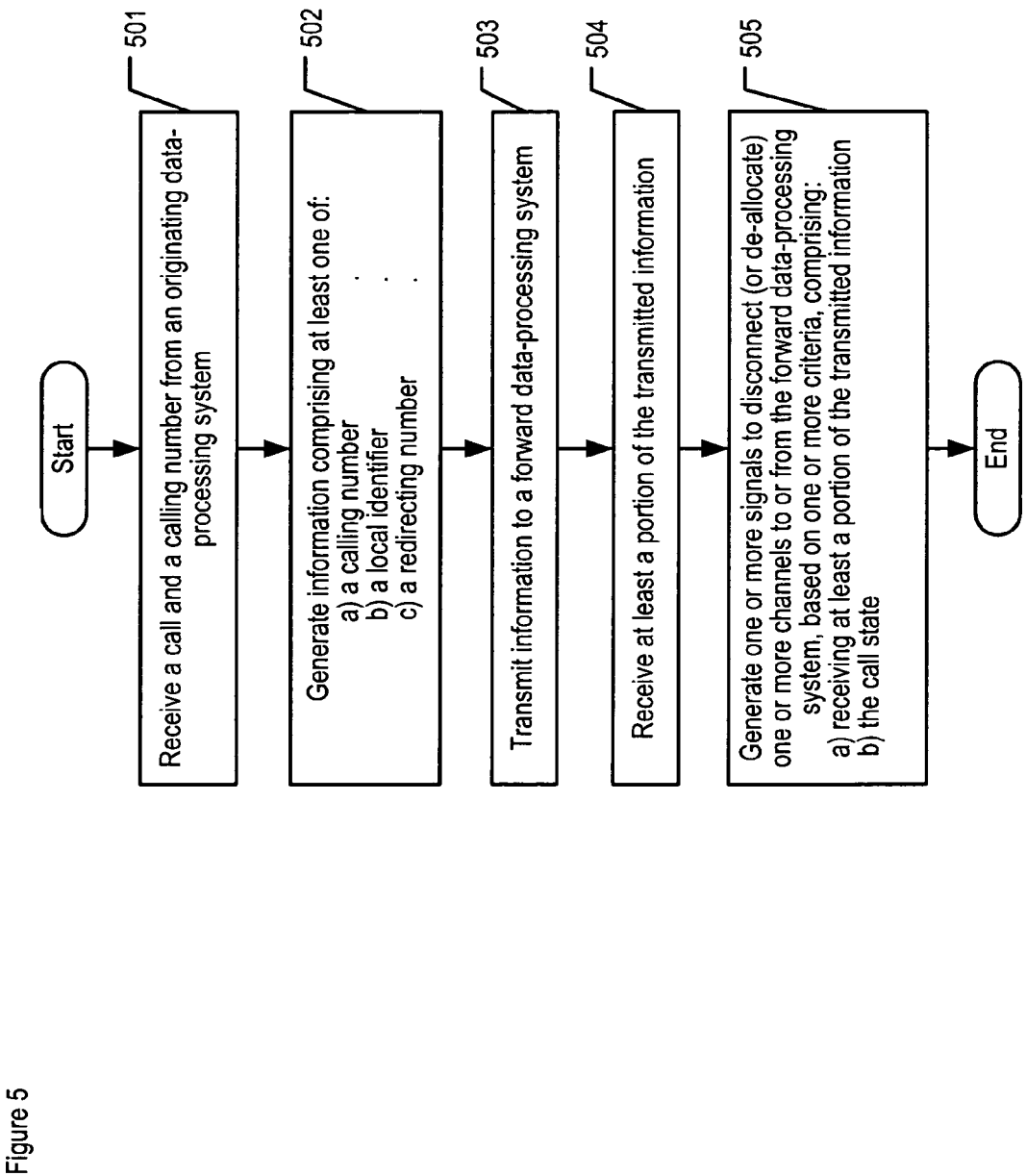
FIG. 5 depicts a flowchart of the salient tasks of data-processing system 202, in accordance with the illustrative embodiment of the present invention.

FIG. 5 depicts a flowchart of the salient tasks performed by (detecting) data-processing system 202 in detecting the looping of communication channels, in accordance with the illustrative embodiment of the present invention. The description that follows draws from the same call-forwarding example used with respect to FIG. 4. It will be clear to those skilled in the art which tasks depicted in FIG. 5 can be performed simultaneously or in a different order than that depicted.

The example provided is for a single originating call. It will be clear, however, to those skilled in the art and after reading this specification how to perform detection for multiple calls concurrently.

At task 501, data-processing system 202 receives from originating data-processing system 201, in well-known fashion, message 401 that comprises a calling number associated with an incoming call. The calling number corresponds to a telecommunications terminal that originates the call via originating data-processing system 201.

At task 502, data-processing system 202 generates information related to the incoming call—at this point considered to be an "existing" call—in accordance with the illustrative embodiment. The information comprises: (i) the calling number, (ii) a call identifier, and (ii) a redirecting number. The call identifier is coded by data-processing system 202 to represent a specific call made by a specific calling terminal, such as the existing call in the example. The redirecting number represents the extension of the called telecommunications terminal that is associated with detecting data-processing system 202, from which the call is to be redirected (e.g., forwarded, transferred, etc.). Data-processing system 202 stores the three information elements into memory 303 as part of a record of the existing call.

At task 503, data-processing system 202 transmits message 402 that comprises the generated information to forward data-processing system 203, in accordance with the illustrative embodiment. In some alternative embodiments, only a subset of the information generated in the illustrative embodiment is transmitted, such as the calling number and calling identifier only, etc.

All of the generated information is transmitted in accordance with the illustrative embodiment due to the possible inconsistencies in how messages and information elements in those messages are handled throughout telecommunications system 200. As an example of the inconsistencies that might be encountered, detecting data-processing system 202 handles (i) the calling number, (ii) a call identifier, and (ii) the redirecting number, while forward data-processing system 203 is not guaranteed to preserve the calling number or the redirecting number transmitted to it. In other words, the calling number, if its value is preserved throughout telecommunications system 200, might be the truest indication of the calling party of a call, while the generated call identifier might be the most reliable indication of the calling party.

At task 504, data-processing system 202 receives from forward data-processing system 203 message 403 that comprises at least a portion of the previously-generated information.

At task 505, data-processing system 202 examines the called number in message 403 as it does with any message that is associated with an incoming call. In accordance with the illustrative embodiment, the called number is checked against extensions that are known to be redirecting numbers. If the called number matches a redirecting number for an existing call, such as the one transmitted to forward data-processing system 203 (the record of which was stored previously in memory 303), then data-processing system 202 checks for any outgoing calls related to the matched redirecting number (e.g., to forward data-processing system 203, etc.) that are in one of a non-empty set of particular call states. The set of particular call states might include Outgoing Call Proceeding, in which call resources have been set up for the call, or Call Delivered, in which call resources have been set up and ringback is occurring.

If there is an outgoing call in the particular state, then data-processing system 202 checks the portion of information returned in message 403. If any of the received (i) calling number, (ii) call identifier, and (iii) redirecting number match with that of the existing call, then data-processing system 202 has detected that a loop has occurred. As a result, detecting data-processing system 202 generates a signal to disconnect (or de-allocate) communication channel 206, in accordance with the illustrative embodiment of the present invention. In some alternative embodiments, detecting data-processing system 202 might also generate a signal to disconnect (or de-allocate) communication channel 205. It will be clear to those skilled in the art how to disconnect one or more communication channels and, in general, to de-allocate call resources.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    generating (502), at a first data-processing system (202), a call identifier that represents a specific call made from a specific calling terminal, wherein said call identifier is separate from the calling number and the called number of the call;
    transmitting (503), to a second data-processing system (203), said call identifier as part of information related to said call, wherein said call is tandemed out of said first data-processing system (202) to said second data-processing system (203); and
    generating (505) a first signal at said first data-processing system (202) to disconnect a first communication channel (206) associated with said call;

wherein generating said first signal occurs after said information related to said call is transmitted; and wherein generating said first signal is based on:
- i) receiving at least a portion of said information at said first data-processing system (202) from said second data-processing system (203) as part of a first incoming call identified by a called number,
- ii) whether said called number matches a redirecting number known to said first data-processing system (202),
- iii) whether an outgoing call to said second data-processing system (203) exists that is based on a second incoming call having been made to said redirecting number, and
- iv) whether said call identifier is present in said portion of said information received.

2. The method of claim 1 further comprising receiving a calling number from a third data-processing system (201) from which said second incoming call arrived, wherein said calling number corresponds to the originating party of said second incoming call;

wherein said information transmitted to said second data-processing system (203) comprises said calling number; and wherein generating said first signal is also based on whether said calling number is present in said portion of said information received.

3. The method of claim 2 wherein said information transmitted to said second data-processing system (203) further comprises said redirecting number;

wherein generating said first signal is also based on whether said redirecting number is present in said portion of said information received.

4. The method of claim 1 further comprising generating a second signal to disconnect a second communication channel (204);

wherein said second incoming call arrives via said second communication channel (204); and wherein generating said second signal is based on whether said call identifier is present in said portion of said information received.

5. The method of claim 4 further comprising generating a third signal to disconnect a third communication channel (205), wherein said outgoing call is transmitted to said second data-processing system (203) via said third communication channel (205);

wherein generating said third signal is based on whether said call identifier is present in said portion of said information received.

6. The method of claim 5 wherein said first communication channel (206) and said third communication channel (205) are of an Integrated Services Digital Network.

7. The method of claim 1 wherein whether said outgoing call to said second data-processing system (203) exists is based on said outgoing call being in a state in which the call delivery to said second data-processing system (203) of said outgoing call is at least proceeding.

8. A method comprising:

generating (502), at a first data-processing system (202), a call identifier that represents a first call made from a specific calling terminal, wherein said call identifier is separate from the calling number and the called number of the first call, and wherein said first call arrives via a first communication channel (204);

transmitting (503), to a second data-processing system (203), said call identifier as part of information related to said first call, wherein said call is tandemed out of said first data-processing system (202) to said second data-processing system (203); and receiving (504), at said first data-processing system (202) from said second data-processing system (203), at least a portion of said information; and generating (505) a first signal to disconnect said first communication channel (204), wherein the generation of said first signal is based on whether said call identifier is present in said portion of said information received.

9. The method of claim 8 further comprising receiving a calling number from a third data-processing system (201) from which said first call arrived;

wherein said calling number corresponds to the originating party of said first call; and wherein said information comprises said calling number; and wherein the generation of said first signal is also based on whether said calling number is present in said portion of said information received from said second data-processing system (203).

10. The method of claim 9 further comprising:

receiving a called number, at said first data-processing system (202) from said second data-processing system (203); and checking said called number against a first set of one or more redirecting numbers, wherein said first set comprises a redirecting number that corresponds to a number that routes to said second data-processing system (203);

wherein the generation of said first signal is also based on the checking of said called number.

11. The method of claim 10 wherein the generation of said first signal is also based on said first call being in a state in which the call delivery to said second data-processing system (203) of said first call is at least proceeding.

12. The method of claim 10 wherein said information transmitted to said second data-processing system (203) comprises said redirecting number.

13. The method of claim 12 further comprising checking a telephone number received from said second data-processing system (203) in said portion of said information against said redirecting number;

wherein the generation of said first signal is also based on the checking of said telephone number.

14. The method of claim 8 further comprising generating a second signal to disconnect a second communication channel (206) that is connected from said second data-processing system (203), wherein the generation of said second signal is based on whether said call identifier is present in said portion of said information received.

* * * * *